(12) United States Patent
Meter

(10) Patent No.: US 7,966,972 B2
(45) Date of Patent: Jun. 28, 2011

(54) METHOD AND DEVICE FOR THE INCUBATION OF EGGS

(75) Inventor: Tjitze Meter, Veenendaal (NL)

(73) Assignee: HatchTech Group B.V. (NL)

( * ) Notice: Subject to any disclaimer, the term of this patent is extended or adjusted under 35 U.S.C. 154(b) by 173 days.

(21) Appl. No.: 12/282,798

(22) PCT Filed: Mar. 13, 2006

(86) PCT No.: PCT/NL2006/050054
§ 371 (c)(1),
(2), (4) Date: Oct. 8, 2008

(87) PCT Pub. No.: WO2007/142511
PCT Pub. Date: Dec. 13, 2007

(65) Prior Publication Data
US 2009/0038557 A1    Feb. 12, 2009

(51) Int. Cl.
*A01K 41/00* (2006.01)
*A01K 41/06* (2006.01)
(52) U.S. Cl. .................................. 119/300; 119/325
(58) Field of Classification Search .................. 119/300, 119/322, 324–326
See application file for complete search history.

(56) References Cited

U.S. PATENT DOCUMENTS

| 4,512,285 | A | 4/1985 | McGehee |
| 6,196,160 | B1 * | 3/2001 | Pas ................................. 119/322 |
| 6,708,755 | B1 * | 3/2004 | Meter ............................. 165/53 |
| 7,021,552 | B2 * | 4/2006 | Meter ................................ 236/2 |
| 7,861,673 | B2 * | 1/2011 | Huisinga et al. .............. 119/300 |

FOREIGN PATENT DOCUMENTS

| RU | 2033042 C1 | 4/1995 |
| WO | 97/14300 A1 | 4/1997 |
| WO | 00/08922 A1 | 2/2000 |

* cited by examiner

*Primary Examiner* — Kimberly S Smith
*Assistant Examiner* — Joshua Huson
(74) *Attorney, Agent, or Firm* — The Webb Law Firm

(57) ABSTRACT

The invention relates to a method for the incubation of eggs and to a device for the incubation of eggs. The incubation device includes a cabinet provided with a climate control for regulating the atmospheric humidity and temperature of the air that is to be passed through the cabinet, and at least one frame. At least one stack of trays positioned vertically above one another is arranged in the frame, each tray having a multiplicity of egg positions for receiving an egg. To turn the eggs, the trays of the stack can pivot to and fro through a defined pivot angle about a horizontal axis with respect to the frame. The vertical distance between the trays positioned above one another thereby changes. In the method, the trays are periodically pivoted through the defined pivot angle and the magnitude of the defined pivot angle is variable.

16 Claims, 5 Drawing Sheets

METHOD AND DEVICE FOR THE INCUBATION OF EGGS

BACKGROUND OF THE INVENTION

1. Field of the Invention

The present invention relates to a method for incubating, in particular pre-incubating, eggs, in which use is made of an incubating device, comprising:

- a cabinet provided with a climate control for controlling the atmospheric humidity and temperature of air that is to be passed through the cabinet; and
- at least one frame, in which there is arranged at least one stack of trays placed vertically above one another, each tray comprising a multiplicity of egg positions, in each of which an egg can be received, the trays of the stack being pivotable back and forth through a defined pivot angle about a horizontal axis with respect to the frame, in order to turn the eggs, in such a manner that the vertical distance between trays located above one another is dependent on the angle position of the said trays with respect to the horizontal plane;

the trays being periodically pivoted through the said defined pivot angle, while the frame with eggs positioned in the egg positions is located in the cabinet and the climate in the cabinet is being controlled by the climate control.

The invention also relates to an incubation device for the incubation, in particular. preincubation, of eggs, comprising:

- a cabinet provided with a climate control for controlling the atmospheric humidity and temperature of air that is to be passed through the cabinet; and
- at least one frame, in which there is arranged at least one stack of trays placed vertically above one another, each tray comprising a multiplicity of egg positions, in each of which an egg can be received, the trays of the stack being pivotable back and forth through a defined pivot angle about a horizontal axis with respect to the frame, in order to turn the eggs, in such a manner that the vertical distance between trays located above one another is dependent on the angle position of the said trays with respect to the horizontal plane;
- pivot means for each stack for periodically pivoting the trays through the defined pivot angle.

2. Description of the Related Art

It is generally known to incubate eggs in incubation devices, which substantially comprise a cabinet with climate control. The eggs that are to be incubated are placed upright, with the air cell facing upwards, in racks in the cabinet. Furthermore, it is generally known that during incubation the eggs have to be turned at regular intervals, inter alia in order to prevent the embryos from sticking to the eggshell. Embryos which have stuck to the eggshell die during the incubation process. During incubation, the eggs are generally initially preincubated in a first cabinet (during which process the chicks do not yet emerge from the egg), and are then placed in a second cabinet in order ultimately to be hatched therein (with the chicks emerging from the egg). The first and second cabinets may be the same cabinet, but in practice are often different cabinets, in which case the eggs are then transferred between the cabinets.

The first industrial large-scale incubation devices reached the market during the period from 1940-1960. In some countries, such devices are still in use. These are what are known as drum incubation machines. The racks of eggs in these drum incubation machines form part of the machine. Each rack contains a number of trays, on each of which eggs are situated. The trays are in this case fixed to the rack. The turning is carried out by tilting the entire rack. The vertical distance between trays located above one another within a rack in this case remains unchanged.

From about 1970, a development occurred according to which trolleys having a stack of trays holding eggs on each trolley are moved into the incubation device, in particular a chamber of the incubation device. Each trolley in this case comprises a frame on wheels or castors or other guides. Each frame in this case has a multiplicity of trays positioned above one another. Each tray has a multiplicity of egg positions. In this case, the turing is not effected by tilting the entire frame/trolley, but rather by tilting the trays about a horizontal axis with respect to the frame/trolley. The trays are each tilted from a first position to a second position. The first position and the second position are in this case complementary to one another, i.e. in the first position the angle of the tray with respect to the horizontal plane is $-\beta$ degrees, and in the second position the angle of the tray with respect to the horizontal plane is $+\beta$ degrees. During pivoting, therefore, the pivot angle is $2\times\beta$ degrees. Specialists in the field therefore refer to a turning angle of $\beta$ degrees. In the prior art, $\beta$ is set to a fixed, invariable value, generally in the range from 38 to 45 degrees. When turning is being carried out in a hatching device with hatching trolleys of this type, it is observed that during tuning the vertical distance between trays positioned above one another changes. This distance is at a maximum at $0°$, i.e. with horizontally positioned trays, and this distance is at a minimum in the first and second positions.

In the prior art and also according to the invention, the turning is carried out periodically. This turning generally takes place once every hour; however, according to the invention it can also take place at a lower or higher frequency.

In a system having trolleys which are moved into the incubation machine, it is also known to weigh the eggs in one single tray and to monitor the weight loss of the eggs during incubation on this basis. This weight loss occurs because during incubation the eggs evaporate (sweat) moisture and release gases. During incubation, in this known method the weight loss is monitored and the weight loss is influenced by controlling the relative humidity, the ventilation rates and the $CO_2$ content of the air passed through the cabinet. Therefore, in the known method and device, the incubation is optimized by virtue of aiming to realize a weight loss of approximately 12% at a predetermined finishing time.

Although this known method does permit some optimization, in so far as the aim is an overall weight loss of approximately 12%, this method nevertheless does not permit accurate precision control and also, for example, does not make it possible to take into account the fact that not all the eggs in a batch of eggs to be hatched in a cabinet are identical. The quality of eggs generally differs from stack to stack. Furthermore, the incubation process does not take place identically at all positions in the chamber. In the known method, as has been stated, the relative atmospheric humidity, the ventilation rate and the $CO_2$ level are acted on to enable the weight loss to be controlled. This process is identical for all the plurality of stacks in a cabinet.

SUMMARY OF THE INVENTION

It is an object of the present invention to provide a method and a device which allow simple influencing of the incubation process of the eggs in the stack, and therefore allow this incubation process to be controlled.

With regard to the method, this object is achieved by providing a method which is also characterized in that the method comprises the following steps:

a) carrying out at least one measurement which is representative of the instantaneous value of at least one incubation parameter;
b) determining an optimum pivot angle for pivoting the trays of the said stack as a function of the said instantaneous value;
c) setting the size of the said defined pivot angle to the optimum pivot angle; or in that during the incubation an adjustment step is carried out, in which the magnitude of the defined pivot angle is adjusted one or more times, in particular to a value that is not equal to 0°.

With regard to the device, according to the invention this object is achieved by providing a device which is characterized in that the incubation device also comprises control means designed to adjust the magnitude of the defined pivot angle during the incubation.

The present invention is based on the insight that the change in vertical distance between trays located above one another during pivoting of these trays in order to turn them can be used to influence the process of the incubation of the eggs. For a larger turning angle, the vertical distance between trays located above one another will be smaller than if a smaller turning angle is used. The shorter the vertical distance between trays located above one another (and therefore the larger the turning angle), the greater the flow resistance to which air flowing between the trays is subjected will become. A greater flow resistance of the air generally means a lower flow rate of the air, and conversely a lower flow resistance generally means a higher flow rate. Therefore, the incubation parameters, which are dependent on the flow resistance presented to air flowing past the eggs or on the air velocity of air flowing past the eggs, will be influenced according to the tuning angle. Incubation parameters of this type include, for example:

the temperature of the egg(s);
the temperature of the air;
the weight of the egg(s);
the change in weight of the egg(s) per unit time;
the evaporation of moisture from the egg(s);
the release of $CO_2$ from the egg(s);
the uptake of $O_2$ by the egg(s).

In order now to make use of this phenomenon, the method according to the invention provides for steps a), b) and c). In step a), at least one measurement is carried out, on the basis of which the instantaneous value—i.e. the value at the moment of measurement—of an incubation parameter of the eggs in the said stack can be determined, and the instantaneous weight is determined on the basis of this measurement. For a measurement of this type, it is possible to measure substantially any physical variable or combination of physical variables, provided only that it allows determination or at least estimation of the instantaneous value of an incubation parameter. One important incubation parameter is the weight of the eggs. A weight measurement is then the obvious option, but, as a person skilled in the art will be aware, it is also possible for the instantaneous weight of the eggs to be derived from evaporation measurements, gas content measurements and temperature measurements. However, during a later phase of incubation, the temperature of the eggs or any chicks which have already hatched is also an important incubation parameter. A temperature measurement is then the obvious answer. Then, in step b), an optimum pivot angle for the pivoting of the trays of the said stack is determined as a function of the (measured) instantaneous value for the said incubation parameter. Then, in a step c), the defined pivot angle used by the method up until the determination in step b) will be altered by setting it to be equal to the optimum pivot angle determined in step b). Obviously, this will in effect not give rise to any change if the optimum pivot angle ascertained in step b) should happen to be equal to the defined pivot angle which is already being used.

Assuming an incubation parameter that is representative of the weight of the eggs, it is possible, so to speak, to state that if the instantaneous weight appears to be too high in step b) an optimum pivot angle will be determined, which is smaller than the defined pivot angle which has been used hitherto, in order then, after application of step c), to continue with the optimum pivot angle as the defined pivot angle. Conversely, if the instantaneous weight should prove to be too low, it will be observed that the evaporation is taking place too quickly and therefore needs to be decelerated, which results in an increase in the pivot angle, so that in step b) an optimum pivot angle will be determined which is greater than the defined pivot angle used hitherto.

It is noted that if the required knowledge of the incubation process is available, measurements during incubation may be surplus to requirements, and that in that case (based on the same insight which forms the foundation of the invention, namely changing the magnitude of the turning angle in order to influence an incubation parameter), on the basis of this knowledge, the turning angle can be adjusted one or more times during the incubation of the eggs, in particular to a value which is not equal to 0°.

As has already been indicated, according to an advantageous embodiment of the invention, the incubation parameter comprises the weight of the eggs in the said stack.

Furthermore, in the method according to the invention it is advantageous if the aim is for the eggs in the stack to have a defined target weight at a predetermined time. Having a defined desired weight at a predetermined time has been found to be of very great benefit to the quality of the chicks which subsequently hatch out of the eggs. In this context, it is advantageous in particular if the determining of the optimum pivot angle according to step b) takes place in such a manner that, starting from the said instantaneous weight, the desired weight is reached at the said time.

In order to allow the incubation process, which will generally last 3 weeks, to be adjusted a number of times, according to the invention it is advantageous if, in the method, steps a), b) and c) are repeated one or more times and/or if, in the case of the device, the control means are designed to repeat steps I) and II) one or more times.

To further optimize the method device according to the invention, it is advantageous if steps a), b) and c) or I) and II), respectively, are repeated periodically, such as once or twice a day.

The incubation process can be further improved with the method according to the invention or device according to the invention, if the incubation device comprises two or more of the said stacks, if steps a), b) and c) or I) and II) are carried out separately for each stack. Overall, the deviation with respect to a desired value for one or more incubation parameters, such as in the case of the weight of the eggs from a stack the desired weight which is aimed for, will be minimized. Incidentally, it should be noted that the desired value may differ for each stack. Minimizing the deviation with respect to the desired value, such as the desired weight, in the end result inherently represents an improvement to the accuracy with which the incubation process is controlled.

In the method according to the invention, it is advantageous if two measurements of the same incubation parameter are carried out in step a). Accordingly, in the hatching device according to the invention, it is in this context advantageous if the control means are designed to perform or use two measurements of the same incubation parameter in step I) or II). If two measurements of the same variable are used, it is possible to measure the change in this variable. This may be a change over the course of time, for example with two weight measurements carried out in succession. However, this may also be a change over the course of a certain distance, for example when measuring the atmospheric humidity on the upstream side of the stack at the same time as measuring the atmospheric humidity on the downstream side of the stack. In step a), measurements of this type can be used to determine the instantaneous weight, if appropriate to make this determination more accurate, and in step b) these measurements can be used to determine the optimum pivot angle, since measurement of this type provide information about the rate of change in the said measured variable and therefore allow the optimum pivot angle to be determined more accurately.

Furthermore, in the method according to the invention it is advantageous if a starting weight is determined for the eggs in the said stack and if this starting weight is in each case used in step b) for the determination of the optimum pivot angle. Accordingly, in the device according to the invention, it is advantageous if the control means are designed to use a starting weight for the eggs in the said stack in step I) in each instance when determining the optimum pivot angle. The starting weight, which will remain invariable once it has been determined during the incubation process, provides a fixed reference point which can be used as a starting point A fixed reference point of this type is advantageous both for the more accurate determination of the instantaneous weight and for the more accurate determination of the optimum pivot angle.

According to the invention, it is advantageous if the starting weight is determined prior to step a) being carried out for the first time, and in particular if the starting weight is determined at or before the start of incubation. During incubation, in practice the weight loss per unit time is dependent on factors such as the type of egg to be incubated. This means that for a large number of incubation batches (i.e. when the method according to the invention has been used a large number of times), an optimum, reciprocally comparable result, the reference value for the starting weight, can best be determined at the very beginning of the incubation process.

Furthermore, in the method according to the invention it is advantageous if the desired weight for the eggs in the said at least one stack is determined on the basis of the starting weight. In the hatching device according to the invention, it is correspondingly advantageous if the control means are designed to determine the desired weight for the eggs in the said at least one stack on the basis of the starting weight. The desired weight can in this case be approximately 83% to 92% of the starting weight, i.e. 8 to 17% evaporation occurs. The desired weight will preferably be approximately 86% to 90%—i.e. 10% to 15% evaporation—of the starting weight, such as approximately 88% to 90% of the starting weight, i.e. 10 to 12% evaporation.

In both the method and the device according to the invention, it is also advantageous if the said predetermined time is in particular between 7 and 21 days, such as around 15 to 18 days, from the start of incubation. This predetermined time may coincide with the moment at which the eggs are transferred to a hatching machine (in which the incubation is concluded and the chicks hatch out of the egg).

As has been indicated above, there are fundamentally various measurements which can be used as the basis for the determination of the instantaneous weight of the eggs in the stack. Therefore, the method according to the invention provides that:

the at least one measurement in step a) comprises a gas concentration measurement, such as a $CO_2$ measurement or an $O_2$ measurement; and/or the at least one measurement in step a) comprises an atmospheric humidity measurement, such as a relative atmospheric humidity measurement, and/or the at least one measurement in step a) comprises a temperature measurement; and/or the at least one measurement in step a) comprises a weight measurement.

Accordingly, the incubation device according to the invention provides that:

the measurement means comprise at least one gas concentration meter for carrying out a gas concentration measurement, such as a $CO_2$ measurement or an $O_2$ measurement; and/or the measurement means comprise at least one atmospheric humidity meter for carrying out an atmospheric humidity measurement, such as a relative atmospheric humidity measurement; and/or the measurement means comprise at least one temperature meter for carrying out a temperature measurement; and/or the measurement means comprise at least one weight meter for carrying out a weight measurement.

In view of the fact that the risk of the embryos sticking to the eggshell is highest in particular at the start of the incubation process and this risk is lower during a later phase, according to the invention it is advantageous if the method comprises a first phase and a second phase, in which case step c) is not carried out in the first phase and steps a), b) and c) are carried out at least once in the second phase. Accordingly, in the incubation device according to the invention, it is advantageous if the control means are designed not to carry out the first step II) in a first phase of incubation and are designed to carry out steps I) and II) at least once during the second phase. As a result of step c) or II) not being carried out in the first phase, there is no change to the turning angle during this first phase. In the first phase, therefore, the turning angle is kept at the defined turning angle used at the beginning. This magnitude is generally dependent on the guidelines provided by the supplier of the hatching device in question and also on the type of eggs to be hatched. Only in the second phase, when the risk of sticking has diminished, do steps a), b) and c) start to be carried out, during which, therefore, the turning angle can be reduced if the evaporation or decrease in weight starts to be too slow.

According to a further embodiment of the invention, depending on the type of eggs the first phase has a duration of from 3 to 7 days from the start of incubation.

According to the invention, the second phase will in particular extend from the first phase to the predetermined time. From the said predetermined time, the trays are often positioned in a permanently horizontal orientation. This could if desired be considered a third phase of the incubation, during which third phase steps b) and c) in any event no longer have to be carried out.

Depending on the type of egg, according to a further embodiment of the invention the first phase and second phase together will last 7 to 21 days, such as 15 to 18 days. By way of example, if the first and second phase together last 21 days and the first phase lasts, for example, 7 days, the second phase will in this example last 14 days.

To minimize sticking of the embryo during the first phase, in the method according to the invention it is advantageous if the defined pivot angle in the first phase is at least 60° (i.e. pivoting to and fro between −30° and +30° with respect to the horizontal plane) and at most 90° (i.e. pivoting to and fro between −45 and +45° with respect to the horizontal plane). Accordingly, in the device according to the invention it is advantageous if the control means are designed in such a manner that the defined pivot angle in the first phase is at least 60° and at most 90° and is preferably invariable.

To have the maximum possible freedom of adjustment in the second phase, in the method according to the invention it is advantageous if the defined pivot angle in the second phase is at least 0° and at most 90°. Accordingly, in the incubation device according to the invention it is advantageous if the control means are designed in such a manner that the defined pivot angle in the second phase is at least 0° and at most 90° and can be altered via step II).

Furthermore, in the method according to the invention it is advantageous if the climate control is actuated so as to adjust the relative atmospheric humidity of the air passed through the cabinet, and if the said relative atmospheric humidity is increased as soon as the instantaneous weight of a stack is equal to or lower than the desired weight of the said stack. The higher the atmospheric humidity, the more difficult it is for evaporation to take place. As a result of the atmospheric humidity being increased as soon as the instantaneous weight of a stack is equal to or lower than the desired weight, it is possible to counteract a further decrease in weight in the said stack, whereas at other stacks if desired the evaporation can still be controlled to some extent by manipulating the pivot angle. If the instantaneous weight has reached or dropped below the desired weight for all the stacks, the relative atmospheric humidity can be made as high as possible in order to counteract any further evaporation. A further advantage of increasing the atmospheric humidity is that the higher the atmospheric humidity, the better the heat transfer between the air and the eggs becomes. Moreover, by acting on the temperature of the air passed through the cabinet and/or the velocity of the air passed through the cabinet, it is possible to regulate the temperature of the said eggs much more successfully at a high atmospheric humidity, which is highly beneficial during this phase of incubation.

In the method and device according to the invention, the air is passed substantially horizontally through the cabinet. This may be a horizontal direction which is transverse with respect to the horizontal axis for pivoting of the trays. This has the advantage that the air moves horizontally into the space between adjacent trays, which runs obliquely with respect to the horizontal plane, and is then deflected in the oblique direction. This promotes contact between the eggs and the air flowing past them, making this contact relatively intimate. However, this horizontal direction may also be a direction that is perpendicular to the said horizontal axis. This has the advantage of the air flow remaining much more uniform.

The present invention will be explained in more detail below on the basis of an example which is diagrammatically depicted in the drawings, in which:

BRIEF DESCRIPTION OF THE DRAWINGS

FIG. 1 shows six of these frames;

DETAILED DESCRIPTION OF THE INVENTION

Figure 1:
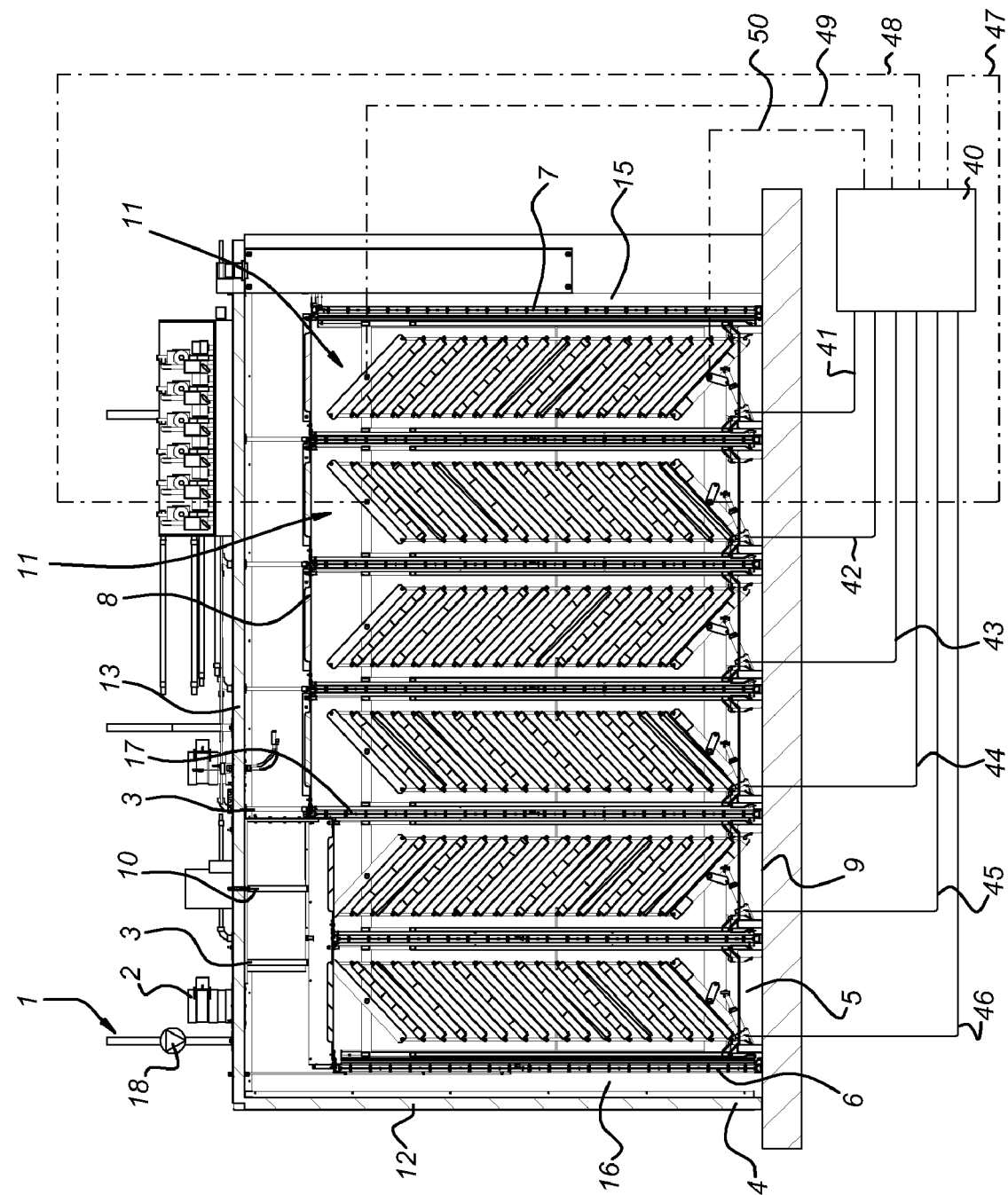
FIG. 1 shows an incubation device according to the invention for employing the method according to the invention.

FIG. 1 shows an incubation device I according to the invention. The incubation device comprises a cabinet 4 with a chamber 5. The chamber 5 is delimited by a ceiling 8, a base 9, two opposite transverse walls 6 and 7 and two opposite longitudinal walls. The chamber comprising ceiling, base, transverse walls and longitudinal walls lies inside the transverse walls 12 and longitudinal walls and ceiling 13 of the cabinet 1. There are spaces for the transport of air between the cabinet ceiling 13 and chamber ceiling 8 and between the transverse walls 6 of the chamber 5 and transverse walls 12 of the cabinet.

The cabinet also comprises a climate control 2, 3, 10 for passing air through the chamber 5 and controlling the atmospheric humidity and temperature of the said air. The climate control comprises a fan 2 for circulating air through the cabinet. In the case shown in FIG. 1, the air is circulated clockwise through the cabinet. The air is passed to the right through a space between the ceilings 8 and 13, then passed downward into the space 15, then out of the space 15 through the chamber transverse wall 7 into the chamber, then is passed five times through a frame 11 and a chamber partition 17, then through the left-hand frame 11, through the chamber transverse wall 6 and is then passed back up to the fan 2 via the space 16. The chamber transverse walls 6 and 7 and the chamber partitions 17 are provided with perforations or other passages to enable the air to pass through. To enable the air to be cooled or heated as it passes through these walls 6, 7 and 17, there are pipe systems in these walls, through which cooling or heating medium supplied via pipes 3 flows. The relative atmospheric humidity in the cabinet can be controlled by means of humidification means 10 and an air supply system 18 for supplying fresh air.

Figure 2:
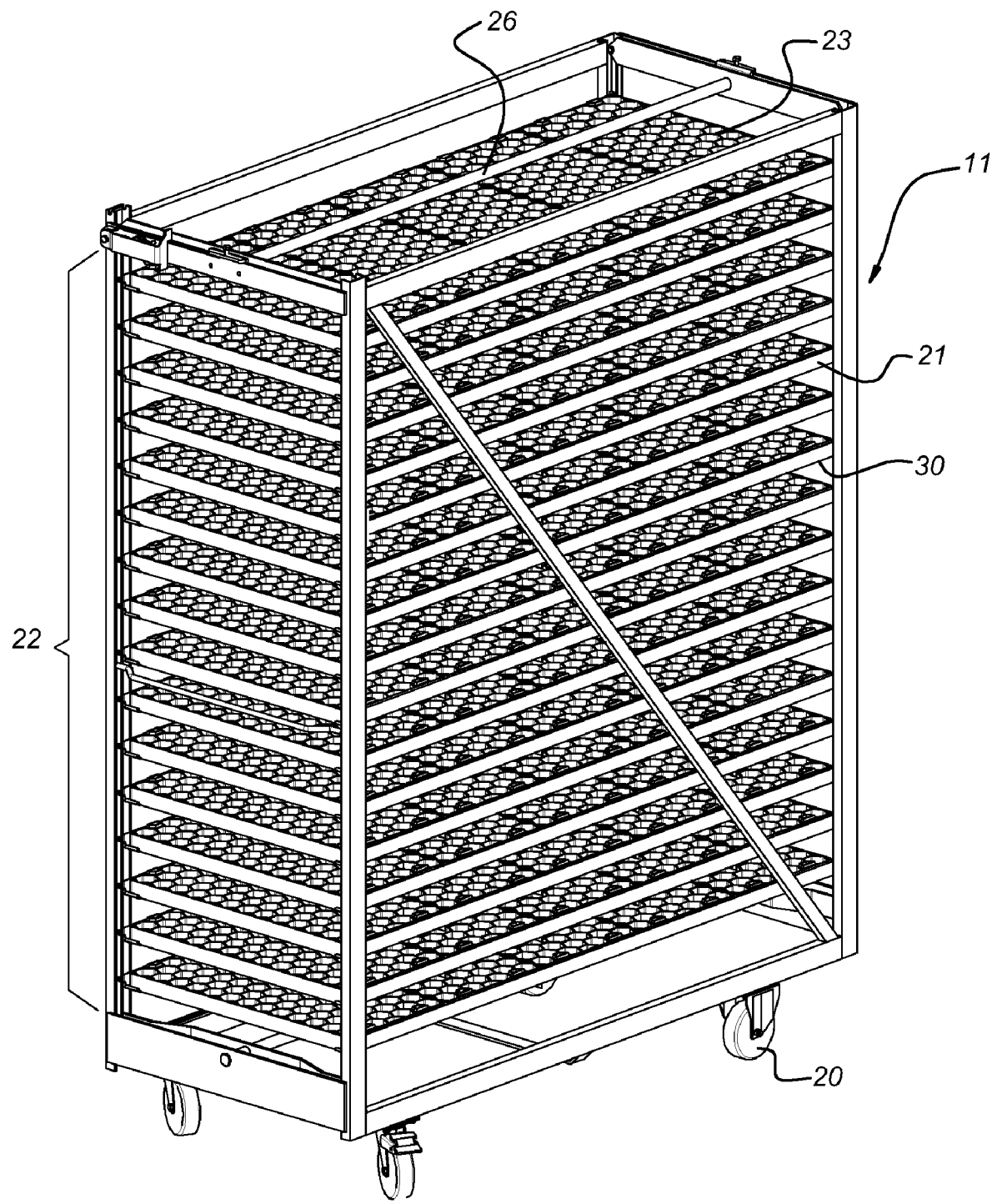
FIG. 2 shows a perspective view of a frame in which there is a stack of trays.

Referring now to FIGS. 2 and 3 as well as FIG. 1, six frames 11—although there may also be more or fewer frames—are positioned in the chamber 5 of the cabinet. Each frame has wheels 20, so that it can be moved into and out of the chamber 5. Furthermore, each frame 11 has a stack 22 of—in this case—sixteen trays 21. Each tray 21 has a multiplicity of egg positions 23, for example 200 to 500 egg positions. In this way, approximately 20,000 to 50,000 (20-50 thousand) eggs can be treated simultaneously in this chamber.

Figure 3A:
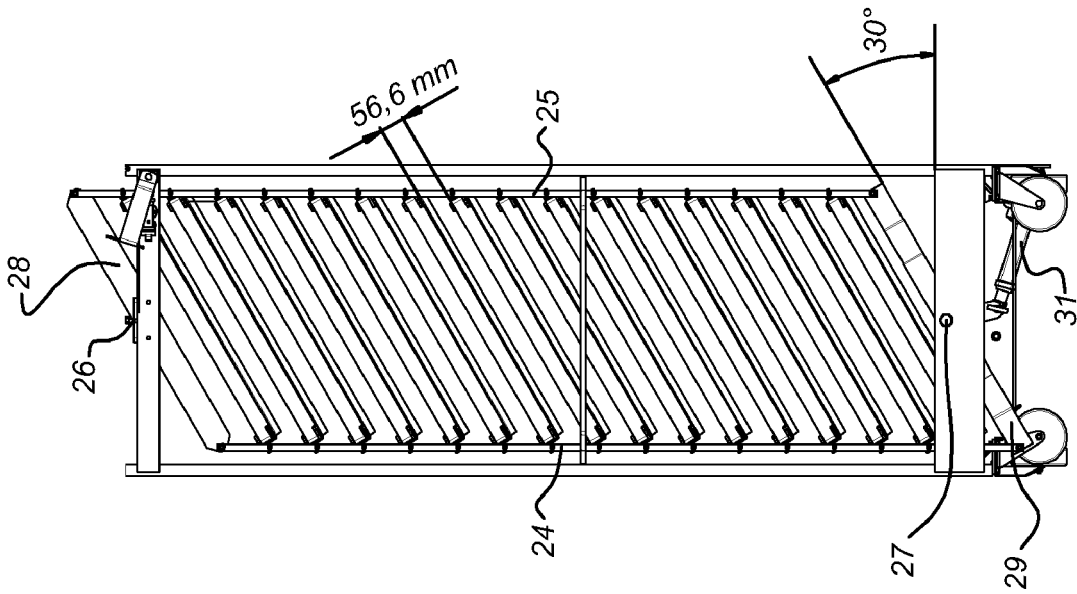
FIGS. 3a-3e show the frame from FIG. 2 with the trays in each case illustrated at a different turning angle.
Figure 3B:
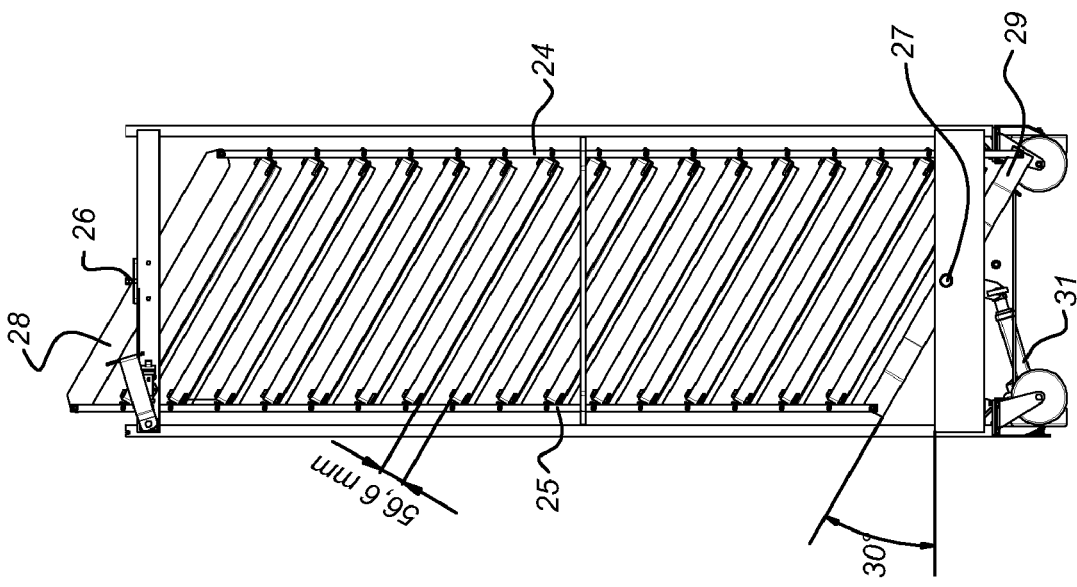

The longitudinal sides 30 of the trays are hingedly attached to a four-bar mechanism 24, 25, 28, 29 which is hinged at the corners. The bottom bar 29 and top bar 28 can rotate about shaft 27 and shaft 26, respectively. The bars 24 and 25 run vertically at all times. By means of a piston/cylinder unit 30 which acts on the bottom bar 29—although it may also act on another bar—, the four-bar mechanism can be moved in such a manner that the trays 21 pivot about a horizontal axis. Referring to FIGS. 3a and 3b, therefore, the trays can be pivoted from a first position (FIG. 3a) to a second position (FIG. 3b) and vice versa. In the first position, all the trays are at an angle of +30° with respect to the horizontal plane, and in the second position they are at an angle of −30° with respect to the horizontal plane. This pivoting takes place in order to turn the eggs. In the case shown in FIGS. 3a and 3b, pivoting takes place through 60°. This is also referred to in the specialist field as turning with a turning angle of 30°.

Figure 4:
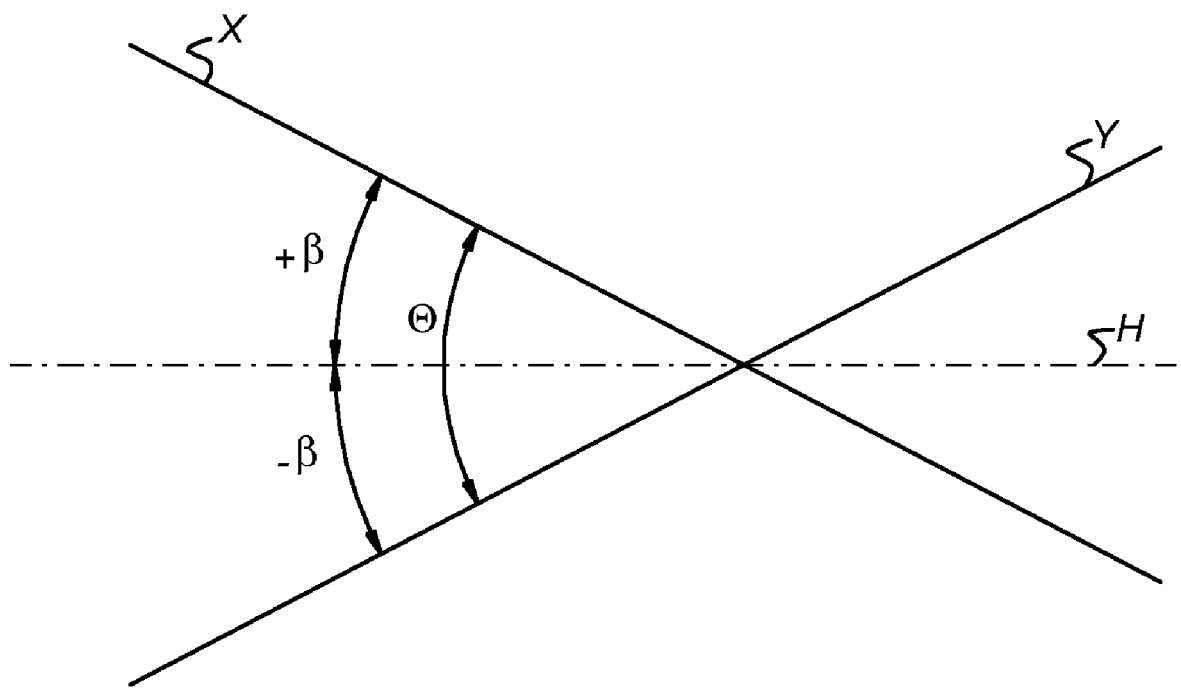
FIG. 4 shows an illustration of the terms pivot angle and turning angle.

The terms turning angle and pivot angle are explained in more detail with reference to FIG. 4. In the relevant specialist field, the term turning angle is generally employed. The pivot angle is equal to 2× the turning angle, at least when pivoting to and fro between −β° and +β°, as assumed in FIG. 4. In FIG. 4, the turning angle is denoted by β and the pivot angle is denoted by θ, and accordingly, therefore, θ=2×β. H denotes the horizontal plane, X indicates a tray in a first position pivoted through an angle +β with respect to the horizontal plane H, and Y denotes a plane pivoted through −β with respect to the horizontal plane H.

Figure 3C:
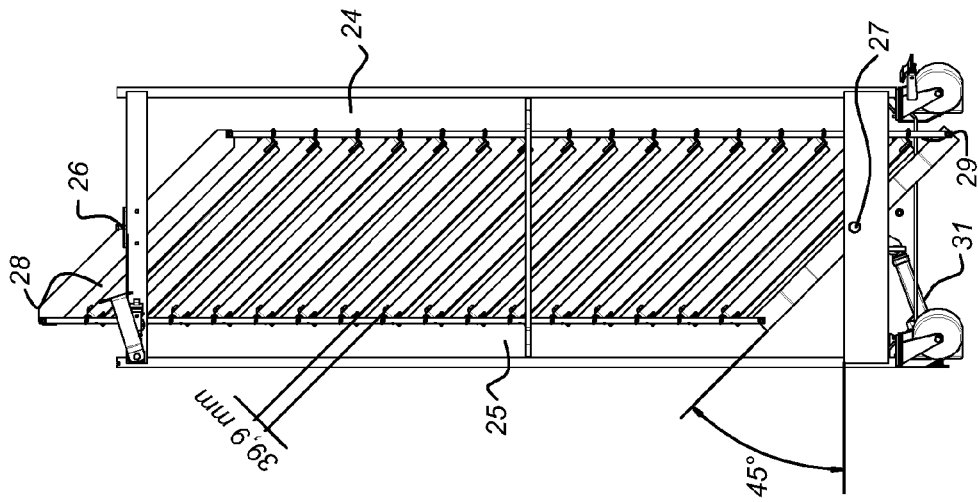
Figure 3D:
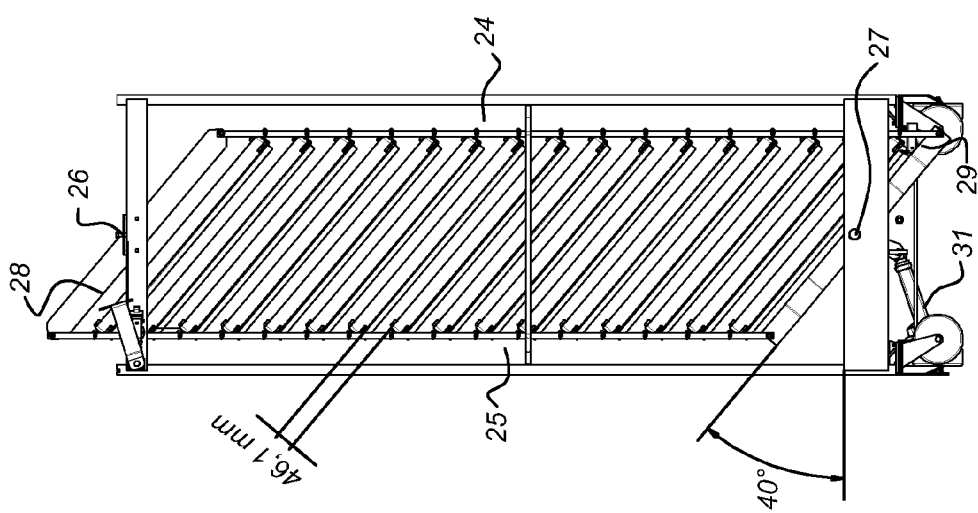
Figure 3E:
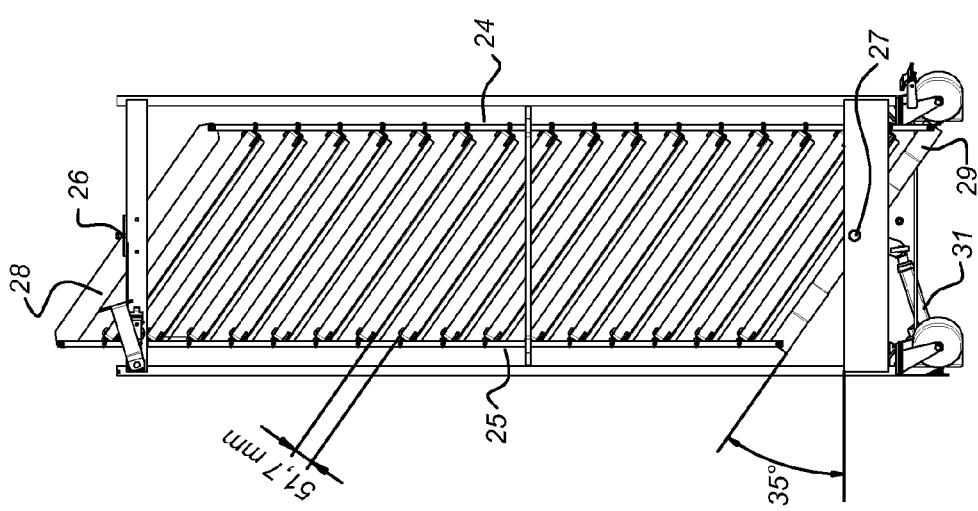

FIGS. 3c, 3d and 3e show the same frame, but with a turning angle of 35°, 40° and 45°, respectively. Furthermore, FIGS. 3a-3e use dimensions in mm to indicate that the vertical distance between trays located above one another changes when the turning angle changes. The dimensions given in the figures are an example. The following can be inferred from FIGS. 3a-3e:

at a turning angle of 30°, the perpendicular distance between trays located above one another is 56.6 mm;
at a turning angle of 35°, the vertical distance between trays located above one another is 51.7 mm;
at a turning angle of 40°, the vertical distance between trays positioned above one another is 46.1 mm;
at a turning angle of 45°, the vertical distance between trays positioned above one another is 39.9 mm.

It is therefore clear that this vertical distance decreases as the turning angle increases and that this vertical distance increases as the turning angle decreases.

Referring to FIG. 1, the incubation device according to the invention is provided with a control unit 40 which forms the control means for controlling the pivoting of the trays. The control lines for this purpose are denoted by 41, 42, 43, 44, 45 and 46. Therefore, each frame has a dedicated control line. The frames 11 can therefore be actuated using different pivot angles. Measurement data is transmitted to the control unit via signal paths 47, 48, 49 and 50. In this case only four signal paths are shown; two each for the two frames on the right-hand side. The other frames are each also connected to the control unit 40 via two corresponding signal paths (not shown).

In the exemplary embodiment described here, the shafts 26 and 27 of each frame are each provided with a weighing sensor. The weight of the trays 30, the four-bar mechanism and the eggs positioned in the trays can be measured or at least determined for each frame/stack using these two weighing sensors. The weight of the eggs alone can be measured/determined by resetting the sensors or by some other form of correction in the control unit.

It is known that during incubation the weight of the eggs decreases, in particular a result of the evaporation of moisture. During incubation, it is also already known to aim for the decrease in weight of the eggs to have a defined value at a defined time after the start. In this context, approximately 10-14% weight loss after about 15-18 days is generally used. However, these numbers are highly dependent on the type of egg. The values given here are customary for chicken eggs. In the case of, for example, quail eggs or duck eggs or turkey eggs, these values will be different.

The present invention is therefore based on the insight that:
Various incubation parameters (i.e. variables which characterize the incubation process and/or change or may change during the incubation process) can be influenced by changing the vertical distance between adjacent trays, i.e. the turning angle.
The evaporation of moisture from the eggs will decrease the shorter the vertical distance between trays positioned above one another or the greater the turning angle; and conversely
the evaporation of moisture from the eggs will increase as the vertical distance between trays positioned above one another increases or the turning angle decreases.

As a result of the weight of the eggs for each stack being measured/determined during incubation, it is possible to establish whether the eggs have evaporated too much or too little moisture in relation to the desired weight that is to be achieved and the turning angle used. Therefore, the turning angle can be adjusted if too much or too little moisture has evaporated. The turning angle will be increased if too much moisture has evaporated and will be reduced if too little moisture has evaporated. When establishing whether too much or too little moisture has evaporated, it is possible to make use of knowledge of the evaporation process, in other words data previously obtained or defined relationships—such as mathematical or empirical functions—which represent the profile of the weight (or of the evaporation) over the course of time, optionally as a function of the turning angle and/or the type of egg. However, other incubation parameters can also be controlled in this way, such as for example the temperature of the eggs.

The invention claimed is:

1. A method for incubating eggs, in which use is made of an incubating device, comprising:
a cabinet provided with a climate control for controlling the atmospheric humidity and temperature of air that is to be passed through the cabinet; and
at least one frame, in which there is arranged at least one stack of trays placed vertically above one another, each tray comprising a multiplicity of egg positions, in each of which an egg can be received, the trays of the stack being pivotable back and forth through a defined pivot angle about a horizontal axis with respect to the frame, in order to turn the eggs, in such a manner that the vertical distance between trays located above one another is dependent on the angle position of the said trays with respect to the horizontal plane;
the trays being periodically pivoted through the said defined pivot angle, while the frame with eggs positioned in the egg positions is located in the cabinet and the climate in the cabinet is being controlled by the climate control;
wherein the method comprises the following steps:
a) carrying out at least one measurement which is representative of the instantaneous value of at least one incubation parameter;
b) determining an optimum pivot angle for pivoting the trays of the said stack as a function of the said instantaneous value; and
c) setting the size of the said defined pivot angle to the optimum pivot angle.

2. The method as claimed in claim 1, wherein the said incubation parameter comprises the weight of the eggs in the said stack, wherein the aim is for the eggs in the stack to have a defined target weight at a predetermined time in which the said predetermined time is between 7 and 21 days from the start of incubation, wherein the determination of the optimum pivot angle in accordance with step b) takes place in such a manner that, based on the said instantaneous weight, the desired weight is reached at the said time.

3. The method as claimed in claim 1, wherein steps a), b) and c) are repeated one or more times, or periodically and/or steps a), b) and c) are carried out separately for each stack.

4. The method as claimed in claim 1, wherein a starting weight is determined for the eggs in the said stack, and in which this starting weight is in each case used in step b) when determining the optimum pivot angle, wherein the starting weight is determined prior to step a) being carried out for the first time, the starting weight being determined at or before the start of incubation, wherein the desired weight for the eggs in the said at least one stack is determined on the basis of the starting weight, wherein the desired weight is approximately 83% to 92% of the starting weight.

5. The method as claimed in claim 1, in which the at least one measurement in step a) comprises at least one measurement selected from the group consisting of a gas concentration measurement, an atmospheric humidity measurement, a temperature measurement and a weight measurement.

6. A method for incubating eggs, in which use is made of an incubating device, comprising:

a cabinet provided with a climate control for controlling the atmospheric humidity and temperature of air that is to be passed through the cabinet; and at least one frame, in which there is arranged at least one stack of trays placed vertically above one another, each tray comprising a multiplicity of egg positions, in each of which an egg can be received, the trays of the stack being pivotable back and forth through a defined pivot angle about a horizontal axis with respect to the frame, in order to turn the eggs, in such a manner that the vertical distance between trays located above one another is dependent on the angle position of the said trays with respect to the horizontal plane;

the trays being periodically pivoted through the said defined pivot angle, while the frame with eggs positioned in the egg positions is located in the cabinet and the climate in the cabinet is being controlled by the climate control;

wherein the method comprises the steps of:

a) determining an optimum pivot angle for pivoting the trays of the said stack as a function of an instantaneous value of at least one incubation parameter; and b) setting the size of the said defined pivot angle to the optimum pivot angle, and c) carrying out an adjustment step, in which the magnitude of the defined pivot angle is adjusted one or more times to a value that is not equal to 0°.

7. The method as claimed in claim 6, wherein the adjustment takes place as a function of an incubation parameter, wherein the said incubation parameter comprises the weight of the eggs in the said stack, wherein the aim is for the eggs in the stack to have a defined desired weight at a predetermined time, wherein the adjustment step takes place in such a manner that, based on the said instantaneous weight, the desired weight is reached at the said time, wherein the incubation device comprises two or more of the said stacks, and wherein the adjustment step is carried out separately for each stack.

8. The method as claimed in claim 6, which comprises a first phase and a second phase, the adjustment step not being carried out in the first phase, wherein:

the first phase has a duration of 3 to 7 days from the start of incubation, and/or the second phase extends from the first phase to the predetermined time, and/or the first phase and second phase together last from 7 to 21 days, and/or the defined pivot angle in the first phase is at least 60° and at most 90°, and/or the defined pivot angle in the second phase is at least 0° and at most 90°.

9. The method as claimed in claim 6, wherein the climate control is actuated so as to adjust the relative atmospheric humidity of the air passed through the cabinet, the said relative atmospheric humidity being increased as soon as the instantaneous weight of a stack is equal to or lower than the desired weight of the said stack, wherein the climate control also regulates the $CO_2$ concentration of the air that is to be passed through the cabinet.

10. The method as claimed in claim 6, in which the air passed through the cabinet is passed substantially horizontally through the cabinet, wherein the direction of passage of air through the cabinet is selected from the group consisting of substantially perpendicular to the said horizontal axis for pivoting the trays and parallel to the said horizontal axis, wherein the trays are perforated.

11. An incubation device for the incubation of eggs, comprising:

a cabinet provided with a climate control for controlling the atmospheric humidity and temperature of air that is to be passed through the cabinet; and at least one frame, in which there is arranged at least one stack of trays placed vertically above one another, each tray comprising a multiplicity of egg positions, in each of which an egg can be received, the trays of the stack being pivotable back and forth through a defined pivot angle about a horizontal axis with respect to the frame, in order to turn the eggs, in such a manner that the vertical distance between trays located above one another is dependent on the angle position of the said trays with respect to the horizontal plane; and pivot means for each stack for periodically pivoting the trays through the defined pivot angle;

wherein the incubation device also comprises control means for adjusting the size of the defined pivot angle during the incubation and wherein the device is operative for determining an optimum pivot angle for pivoting the trays of the said stack as a function of an instantaneous value of at least one incubation parameter and setting the size of the said defined pivot angle to the optimum pivot angle.

12. The device as claimed in claim 11, also comprising:

measurement means designed to carry out at least one measurement which is representative of the instantaneous value of at least one incubation parameter that is to be measured;

the control means being connected to the measurement means in order for measurement signals originating from the measurement means to be transmitted to the control means, and the control means also being connected to the pivot means, in order for a pivot angle signal which represents the magnitude of the defined pivot angle to be transmitted to the pivot means;

the control means being designed to carry out the following steps:

I) determining an optimum pivot angle for the pivoting of the trays of the said stack as a function of the said instantaneous value;

II) adjusting the pivot angle signal in such a manner that the magnitude of the defined pivot angle becomes equal to the optimum pivot angle.

13. The incubation device as claimed in claim 12, wherein the control means are designed to repeat steps I) and II) one or more times, and/or periodically.

14. The incubation device as claimed in claim 12, which comprises two or more of the said stacks, measurement means being provided for each stack, and wherein the control means are designed to carry out steps I) and II) separately for each stack, and/or in which the control means are designed to use two measurements representative of the same incubation parameter in step I), and/or the control means are designed to use in each case a starting value for the hatching parameter that is to be measured in step I) when determining the optimum pivot angle.

15. The incubation device as claimed in claim 12, wherein the hatching parameter that is to be measured comprises the weight of the eggs in the said stack, wherein the control means are designed to use in each case a starting value for the hatching parameter that is to be measured in step I) when determining the optimum pivot angle, wherein the control means are designed to determine the desired weight for the eggs in the said at least one stack on the basis of the starting weight, wherein the control means are designed to determine the desired weight at approximately 83% to 92% of the starting weight and wherein the measurement means comprise at least one gas concentration meter for carrying out a gas concentration measurement.

16. The incubation device as claimed in claim 12, wherein the measurement means comprise at least one meter selected from the group consisting of an atmospheric humidity meter for carrying out an atmospheric humidity measurement, a temperature meter for carrying out a temperature measurement, a weight meter for carrying out a weight measurement, and a combination thereof, and/or in which incubation device the control means are designed:
to actuate the incubation device in such a manner that the eggs in the stack have a defined desired weight at a predetermined time, and/or
not to adjust the magnitude of the defined pivot angle during a first phase of the incubation and to adjust the magnitude of the defined pivot angle in a second phase of the incubation, wherein the first phase has a duration of from 3 to 7 days from the start of incubation, wherein the second phase extends from the first phase to the predetermined time, wherein the first phase and second phase together last from 7 to 21 days, wherein the control means are designed in such a manner that the defined pivot angle is at least 60° and at most 90° in the first phase, and/or at least 0° and at most 90° in the second phase, and/or
to actuate the climate control until a relative atmospheric humidity of the air passed through the cabinet has been adjusted, the said relative atmospheric humidity being increased if the instantaneous weight of one of the at least two stacks is equal to or lower than the desired weight of the said stack, and/or
in which incubation device the climate control is designed to pass the air that is to be passed through the cabinet substantially horizontally through the cabinet, wherein the direction of passage of air through the cabinet is substantially perpendicular to the said horizontal axis for pivoting the trays, or parallel to the said horizontal axis, and wherein the trays are perforated.

* * * * *